July 16, 1968  T. E. JENKINS  3,393,025
LUBRICATION SYSTEM FOR BEARING
Filed Jan. 27, 1966

INVENTOR.
THOMAS E. JENKINS
BY
HIS ATTORNEY

United States Patent Office 3,393,025
Patented July 16, 1968

3,393,025
LUBRICATION SYSTEM FOR BEARING
Thomas E. Jenkins, Louisville, Ky., assignor to General
Electric Company, a corporation of New York
Filed Jan. 27, 1966, Ser. No. 523,341
6 Claims. (Cl. 308—132)

ABSTRACT OF THE DISCLOSURE

An improved lubrication system for bearing means to support a rotatable shaft. The bearing means includes a cylindrical bearing surrounding the shaft along a portion of the shaft's length. A pumping groove is provided in the outer surface of the shaft and a rotating member is positioned adjacent one end of the bearing. A reservoir wick is provided to receive and store a lubricant. A feeder wick is provided that is in lubricant-receiving relationship with the reservoir wick and in lubricant-feeding relationship with the pumping groove. Collecting means are radially spaced from the rotating member to collect the lubricant centrifugally forced from the rotating member. The return wick is wholly spaced from the reservoir wick and is in lubricant-receiving relationship with the collecting means and in lubricant-feeding relationship with the pumping groove whereby lubricant is returned directly to the shaft from the collecting means and by-passes the reservoir wick.

---

This invention relates generally to a bearing means for a rotatable shaft and, more particularly, to an improved lubrication system for such bearing means.

It is well known in the art to which the present invention pertains to feed lubricant from a reservoir to a shaft by means of an absorbent wick and to then pump the lubricant through a bearing by means of spiral grooves on the shaft, the lubricant being returned to the reservoir by gravity. Moreover, it is well known to provide wick means to return the lubricant to the reservoir so that the system does not rely on gravity, thereby allowing the machine within which the bearing is employed to be operated in any position. However, returning the lubricant to the reservoir in many cases is inefficient since the primary object is to return the lubricant to the bearing. It would therefore be advantageous to provide a lubrication system for a bearing which will return the lubricant directly to the spiral groove, bypassing the reservoir.

Accordingly, it is an object of the present invention to provide an improved lubrication system for a bearing.

It is another object of this invention to provide a lubrication system for a bearing wherein the lubricant, after passing through the bearing, is returned directly to the shaft thereby bypassing the reservoir.

It is another object of this invention to provide means which directly returns the lubricant to the shaft and which also serves to feed lubricant from a reservoir to the shaft.

Briefly stated, in accordance with one aspect of the present invention, there is provided, in combination, a rotatable shaft and a bearing means to support the shaft. The bearing means includes a cylindrical bearing surrounding the shaft along a portion of the shaft's length. A pumping groove is provided in the outer surface of the shaft at least along the aforementioned portion and a rotating member is positioned adjacent one end of the cylindrical bearing. A reservoir wick is adapted to receive and store a lubricant. A feeder wick is in lubricant-receiving relationship with the reservoir wick and is in lubricant-feeding relationship with the pumping groove. Collecting means are radially spaced from the rotating member to collect lubricant forced from the rotating member. A return wick is wholly spaced apart from the reservoir wick and is in lubricant-receiving relationship with the collecting means and in lubricant-feeding relationship with the pumping groove whereby lubricant is returned directly to the shaft from the collecting means and by-passes the reservoir wick.

Figure 1:
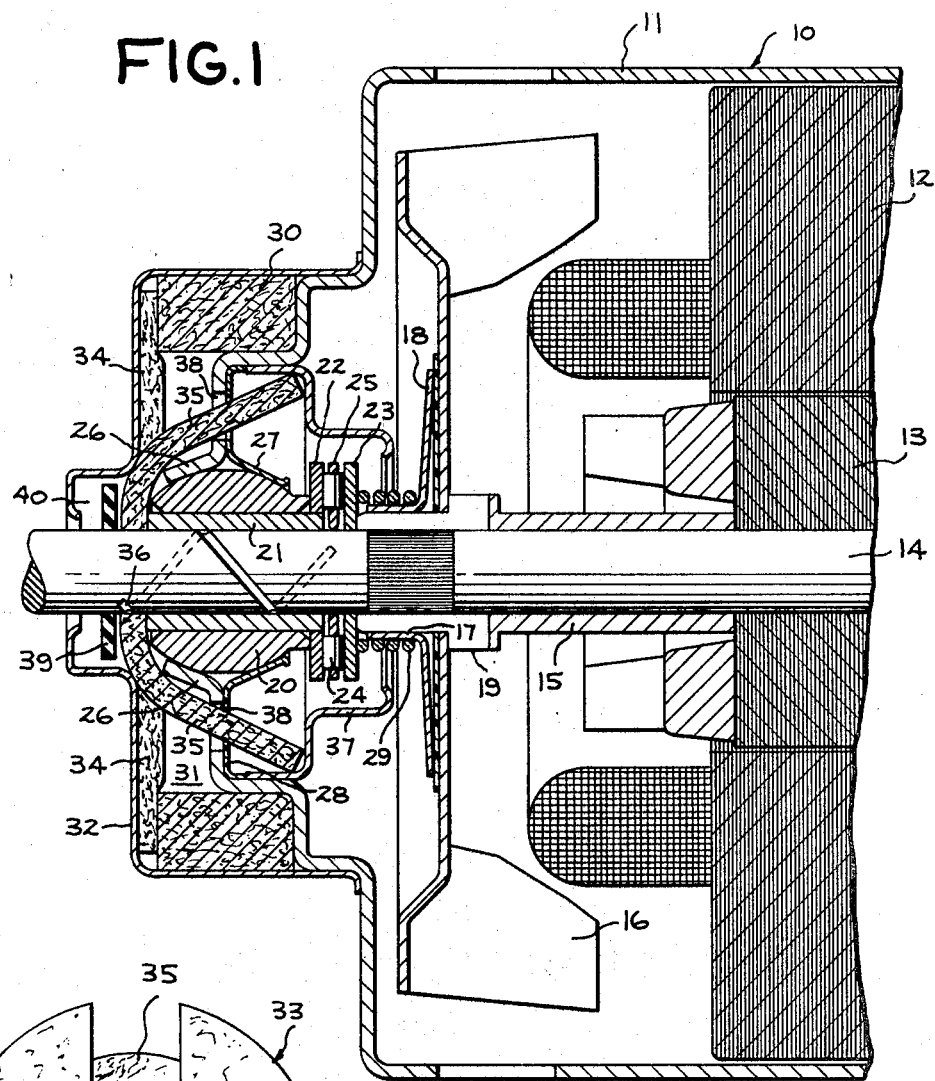
Figure 2:
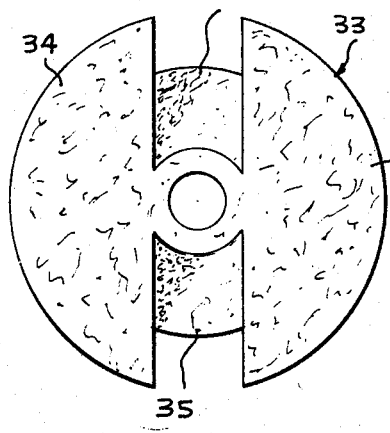

While the specification concludes with claims particularly pointing out and distinctly claiming the subject matter which is regarded as the invention, it is believed the invention will be better understood from the following description taken in connection with the accompanying drawings, in which:

FIGURE 1 is a partial sectional view of an electrical motor employing the present invention; and FIGURE 2 is a perspective view of an element of the present invention.

Referring now to the drawings, and particularly to FIGURE 1 thereof, there is shown an electric motor 10 having an outer casing 11 which supports a stator 12 therein. Stator 12 has a central opening therethrough which receives an armature 13 carried by a rotatable shaft 14. Shaft 14 also carries a collet 15 which slips over shaft 14 to support a motor cooling fan 16. Fan 16 is secured to collet 15 by means of a sleeve 17 having an outwardly projecting flange 18 which engages fan 16 and clamps it into engagement with a shoulder 19 projecting outwardly from the outer surface of collet 15. None of the foregoing, with the exception of the rotatable shaft 14, forms an important part of the present invention and may vary considerably from that illustrated in FIGURE 1 without seriously affecting the present invention.

Bearing means are provided to support one end of shaft 14 and include a substantially spherical support 20 having a central opening therethrough which receives a cylindrical radial bearing 21 through which shaft 14 passes. A stationary thrust plate 22 rests against one end of support 20 and is disposed about one end of bearing 21. A rotating thrust plate 23 is suitably secured to shaft 14 to rotate therewith and transmit any axial force, or thrust, exerted upon shaft 14 to a plurality of cylindrical needles 24 which are held in angularly spaced relationship to each other between plates 22 and 23 by a cage 25. Cage 25 supports needles 24 in a manner whereby needles 24 are free to rotate about their individual longitudinal axes in a manner well known in the art.

Support 20 is carried by a plurality of tabs 26 bent out from a portion of casing 11. Moreover, support 20 is maintained in supported relationship with tabs 26 by a plurality of tabs 27 bent out from a member 28 suitably secured to the inner surface of casing 11 by such means as welding or threaded screw fasteners or simply a press fit into casing 11. A spring 29 of very light force is provided between flange 18 and plate 23 to gently urge plate 23 into engagement with needles 24 and, in turn, needles 24 into engagement with plate 22 during assembly of the foregoing combination of elements. Spring 29 serves no purpose while the foregoing elements remain completely assembled.

In accordance with the present invention, a lubrication system for the afore-described bearing is provided and includes a reservoir wick 30 of generally cylindrical configuration supported within a chamber 31 defined by a housing 32 and the outer surface of casing 11. A combined feeder and return wick 33 having a feeder wick portion 34 and a return wick portion 35 is also provided. Feeder wick portion 34 is in lubricant-receiving relationship with reservoir wick 30 and is adapted to convey lubricant, by capillary action, from reservoir wick 30 to shaft 14. Shaft 14 is provided with a spiral pumping groove 36 which, as shaft 14 rotates in a counterclockwise direction when viewed from the left in FIGURE 1, pumps lubricant received from feeder wick portion 34 through cylindrical bearing 21 thereby providing lubrication between rotating shaft 14 and the stationary bearing 21.

As the lubricant passes beyond the end of bearing 21, it encounters rotating thrust plate 23 which forces the lubricant radially outward by centrifugal force and, as the lubricant passes radially outward, it provides lubrication for the interfaces between needles 24 and thrust plates 22 and 23. As the lubricant passes outwardly beyond thrust plate 23, under the influence of centrifugal force, it is caught and collected by a collecting means 37 which is disposed about, and radially spaced from, thrust plate 23. The lubricant collected by collecting means 37 is picked up by return wick portion 35 which is wholly spaced from the reservoir wick 30 and returns it directly to shaft 14 and pumping groove 36. The lubricant then re-enters pumping groove 36 to follow the path described above. Thus it can be seen that the present invention provides means to directly return the lubricant to the shaft once the lubricant has passed through the bearing being lubricated.

Openings 38 are provided in the member 28 and casing 11 through which return wick 35 passes. In the event that feeder wick 34 provides excessive lubricant to pumping groove 36 and return wick 35 is unable to convey that quantity of lubricant out of collecting means 37, the lubricant will pass through openings 38 into chamber 31 and return to reservoir wick 30 thereby avoiding any loss of lubricant from collecting means 37 into the interior of casing 11.

It should be realized that the present invention may be incorporated into a bearing system which omits thrust plates 22 and 23, needles 24 and cage 25. When these elements are omitted, it is desirable to provide a rotating member similar to thrust plate 23 to centrifugally sling the lubricant out to collecting means 37. Such an arrangement would operate identically to that described above except that when the lubricant passed beyond cylindrical bearing 21, it would be forced out into collecting means 37 and would provide no lubricating function as it does when it leaves bearing 21 in the structure shown in FIGURE 1. Moreover, the combined feeder and return wick 33 need not have the exact configuration shown in FIGURE 2. For example, feeder wick portions 34 could be narrow tabs having a width approximately the same as return wick portions 35, the primary requirement being that they extend out into lubricant-receiving relationship with reservoir wick 30.

A lubricant slinger 39 may be provided to minimize the escape of lubricant toward the left end of shaft 14. Slinger 39 would be secured to shaft 14 to rotate therewith and any lubricant tending to move toward the left on shaft 14, would encounter slinger 39 and would be forced radially outward into a chamber 40 defined by housing 32 and combined feeder and return wick 33. The lubricant collecting in chamber 40 would migrate to combined feeder and return wick 33 by gravity whereupon it would re-enter the flow of lubricant as described above.

As will be evident from the foregoing description, certain aspects of the invention are not limited to the particular details of construction of the example illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. In combination:
   (a) a rotatable shaft,
   (b) bearing means to support said shaft,
   (c) said bearing means including a cylindrical bearing surrounding said shaft along a portion of the length of said shaft,
   (d) pumping means to move lubricant along the outer surface of said shaft at least throughout the length of said portion,
   (e) a rotating member adjacent one end of said cylindrical bearing,
   (f) a reservoir adapted to receive and store a lubricant,
   (g) means including a reservoir wick and a feeder wick to feed lubricant from said reservoir to said pumping means,
   (h) collecting means radially spaced from said rotating member to collect lubricant forced from said rotating member by centrifugal action, and
   (i) means wholly spaced from said reservoir wick to return lubricant from said collecting means directly to said pumping means.

2. In combination:
   (a) a rotatable shaft,
   (b) bearing means to support said shaft,
   (c) said bearing means including a cylindrical bearing surrounding said shaft along a portion of the length of said shaft,
   (d) a pumping groove in the outer surface of said shaft at least along said portion,
   (e) a rotating member adjacent one end of said cylindrical bearing,
   (f) a reservoir wick adapted to receive and store a lubricant,
   (g) a feeder wick in lubricant-receiving relationship with said reservoir wick and in lubricant-feeding relationship with said pumping groove,
   (h) collecting means radially spaced from said rotating member to collect lubricant forced from said rotating member, and
   (i) a return wick wholly spaced from said reservoir wick and in lubricant-receiving relationship with said collecting means and in lubricant-feeding relationship with said pumping groove.

3. The invention of claim 2 wherein said feeder wick and said return wick comprise a unitary element.

4. The invention of claim 2 wherein said bearing means further comprises a thrust bearing having a rotating thrust plate and said thrust plate comprises said rotating member.

5. The invention of claim 4 wherein said pumping groove extends beyond said portion of said shaft to be in lubricant-feeding relationship with said thrust bearing to pump lubricant thereto.

6. The invention of claim 2 wherein said collecting means has at least one opening therethrough whereby lubricant collecting to a level above said opening passes through said opening to said reservoir wick.

References Cited

UNITED STATES PATENTS 2,856,242  10/1958  Stone _____ 308—132

MARTIN P. SCHWADRON, *Primary Examiner.*

FRANK SUSKO, *Examiner.*